United States Patent
Chang et al.

(10) Patent No.: US 8,455,118 B2
(45) Date of Patent: Jun. 4, 2013

(54) COMPOSITE SOFT UNDERLAYER INCLUDING NEGATIVE ANISOTROPY MATERIAL

(75) Inventors: Kai-Chieh Chang, Pleasanton, CA (US); Li Tang, Fremont, CA (US); Shanghsien S. Rou, Fremont, CA (US); Connie Chunling Liu, San Jose, CA (US); Bogdan Florin Valcu, Fremont, CA (US); Wen Jiang, Fremont, CA (US); Tao Zhang, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 277 days.

(21) Appl. No.: 12/872,865

(22) Filed: Aug. 31, 2010

(65) Prior Publication Data
US 2012/0052327 A1 Mar. 1, 2012

(51) Int. Cl.
*G11B 5/62* (2006.01)
*G11B 5/667* (2006.01)

(52) U.S. Cl.
USPC ......... 428/827; 428/828; 428/828.1; 428/829

(58) Field of Classification Search
None
See application file for complete search history.

(56) References Cited

U.S. PATENT DOCUMENTS

| | | | |
|---|---|---|---|
| 8,116,035 B2* | 2/2012 | Takahashi et al. | 360/131 |
| 2002/0028357 A1* | 3/2002 | Shukh et al. | 428/694 TM |
| 2009/0034119 A1* | 2/2009 | Takahashi et al. | 360/110 |
| 2010/0165510 A1* | 7/2010 | Takahashi et al. | 360/135 |

OTHER PUBLICATIONS

Hashimoto, A., Saito, S., and Takahashi, M., J. App. Phys., 99, 08Q907, 2006.*
Takahashi et al., M., and Saito, S., J. Mag., Mag. Mat., 320, 2008, 2868-2873.*
Saito, S., Hashimoto, A., Itagaki, N., and Takahashi, M., Intermag 2006, DB-03 Abstract, p. 253, publ 2006.*
Park, S., Zhu., J., and Laughlin, D., J. App. Phys., 105, 07B723, 2009.*
Atsushi Hashimoto, et al., "A Soft Magnetic Underlayer with Negative Uniaxial Magnetocrystalline Anisotropy...," Journal of Applied Physics 99, 08Q907 (2006).

* cited by examiner

*Primary Examiner* — Kevin Bernatz
(74) *Attorney, Agent, or Firm* — Hollingsworth Davis, LLC

(57) ABSTRACT

An apparatus may include a composite soft underlayer and a perpendicular magnetic recording layer overlying the composite soft underlayer. The composite soft underlayer may include a growth template layer, a negative magnetic anisotropy layer overlying the growth template layer, and a magnetically soft layer overlying the negative magnetic anisotropy layer. In some embodiments, the negative magnetic anisotropy layer includes a plurality of grains, and substantially all the grains have negative magnetic anisotropy along an axis substantially perpendicular to a major plane of the composite soft underlayer. In some embodiments, the negative magnetic anisotropy layer includes a thickness of less than or equal to about 3 nm.

20 Claims, 12 Drawing Sheets

COMPOSITE SOFT UNDERLAYER INCLUDING NEGATIVE ANISOTROPY MATERIAL

SUMMARY

In one aspect, the disclosure is directed to an apparatus including a composite soft underlayer and a perpendicular magnetic recording layer overlying the composite soft underlayer. According to this aspect of the disclosure, the composite soft underlayer includes a growth template layer, a negative magnetic anisotropy layer overlying the growth template layer, and a magnetically soft layer overlying the negative magnetic anisotropy layer. In some embodiments, the negative magnetic anisotropy layer includes a plurality of grains, and substantially all the grains have negative magnetic anisotropy along an axis substantially perpendicular to a major plane of the composite soft underlayer. In some embodiments, the negative magnetic anisotropy layer includes a thickness of less than or equal to about 3 nm.

The details of one or more embodiments of the invention are set forth in the accompanying drawings and the description below. Other features, objects, and advantages of the invention will be apparent from the description and drawings, and from the claims.

DETAILED DESCRIPTION

Some perpendicular magnetic recording media include a soft underlayer, which is a layer of magnetically soft material formed under a perpendicular magnetic recording layer. The soft underlayer facilitates recording of data to the perpendicular magnetic recording layer by increasing a magnetic flux density traveling substantially vertically from the magnetic recording head, through the perpendicular magnetic recording layer, to the soft underlayer at the position where data is written to the perpendicular magnetic recording layer.

However, in some cases, the soft underlayer may contribute to side track erasure (STE) events. In STE events, magnetic flux returning from the soft underlayer, through the perpendicular magnetic recording layer, to the return pole of the magnetic recording head causes switching of the magnetic orientation of a portion of the perpendicular magnetic recording layer at a different location than the location where data recording is intended. STE events lead to errors when reading data stored in the perpendicular magnetic recording layer, and the magnetic data storage device may implement error correction algorithms to correct the read errors.

In accordance with some embodiments described in this disclosure, it has been found that a composite soft underlayer incorporating a layer of a material having a negative magnetic anisotropy field ($K_u$) along an axis oriented substantially perpendicular a major plane of the composite soft underlayer may reduce STE events compared to a soft underlayer which does not include a negative $K_u$ layer. Additionally, in some embodiments, the composite soft underlayer may further include a growth template layer which promotes a preferred crystalline structure of the negative $K_u$ layer. In some embodiments, the composite soft underlayer may include, in addition to the negative $K_u$ layer, at least one layer of magnetically soft material.

Figure 1:
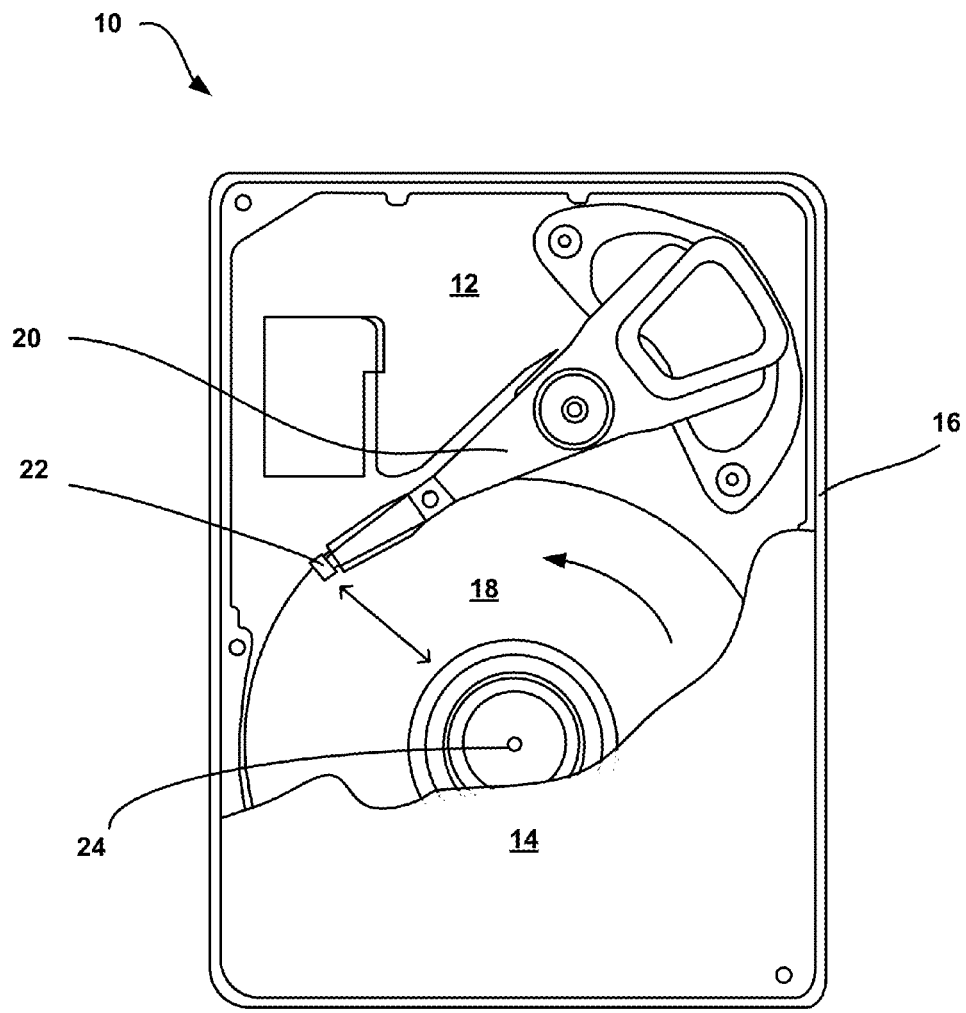
FIG. 1 is a schematic diagram illustrating an example of a hard disc drive according to an embodiment of the disclosure.

FIG. 1 illustrates an example magnetic disc drive 10, which includes a magnetic data storage medium 18 having a composite soft underlayer in accordance with one aspect of this disclosure. Disc drive 10 includes base 12 and top cover 14, shown partially cut away. Base 12 combines with top cover 14 to form the housing 16 of disc drive 10. Disc drive 10 also includes one or more rotatable magnetic disc data storage media 18. Magnetic data storage media 18 are attached to spindle 24, which operates to rotate media 18 about a central axis. Magnetic recording and read head 12 is adjacent to magnetic data storage media 18. Actuator arm 20 carries magnetic recording and read head 22 for communication with each of the magnetic storage media 18.

Magnetic data storage media 18 store information as magnetically oriented bits in a magnetic recording layer. Magnetic recording and read head 22 includes a recording (write) head that generates magnetic fields sufficient to magnetize discrete domains of the magnetic recording layer on magnetic storage media 18. These patterns of domains of the magnetic recording layer represent the bits of data, with changes of the magnetic orientation representing a "1." A "0" is represented by a region comprising a constant magnetization for about twice the bit length. Magnetic recording and read head 22 also includes a read head that is capable of detecting the magnetic fields of the discrete magnetic domains of the magnetic recording layer.

According to one aspect of the present disclosure, magnetic data storage media 18 includes a composite soft underlayer in addition to the magnetic recording layer. The composite soft underlayer includes a layer of granular material having negative $K_u$ along an axis of the material. This layer is referred to herein as a negative $K_u$ layer. The negative $K_u$ layer includes a plurality of grains, and most or substantially all of the grains have an axis along which $K_u$ is negative. In some embodiments, the negative $K_u$ axes of the most or substantially all of the grains in the negative $K_u$ layer are oriented substantially perpendicular to a major plane of the composite soft underlayer. In some embodiments, the negative $K_u$ layer includes CoX, and the grains of CoX may have a hexagonal close packed (HCP) crystalline structure. X may include any one of the 5d transition elements, such as Ir, Re, W, or the like. In HCP CoIr, the c-axis is the axis along which the grain has negative $K_u$. In some examples, the c-axes of most or substantially all of the HCP CoIr grains are oriented substantially perpendicular to the major plane of the composite soft underlayer.

Additionally, the composite underlayer includes a growth template layer. The negative $K_u$ layer overlies the growth template layer. The growth template layer may facilitate formation of the negative $K_u$ layer with a predetermined crystalline structure and orientation (e.g., an HCP structure with c-axes substantially perpendicular to the plane of the negative $K_u$ layer for CoIr), and may allow the negative $K_u$ layer to be relatively thin while still exhibiting negative $K_u$ along the axes of the grains substantially perpendicular to the major plane of the composite soft underlayer. In some embodiments, the growth template layer includes Ru, Ti, or a Ru-based alloy, such as RuTi, RuCr, or the like.

The composite underlayer further includes a layer of magnetically soft material overlying the negative $K_u$ layer. The magnetically soft material may be, for example, an Co- or Fe-based soft magnetic alloy. The layer of magnetically soft material may contribute increased recording efficiency compared to magnetic storage media 108 which do not include a soft underlayer.

In some embodiments, the composite soft underlayer further includes a second layer of magnetically soft material. In such embodiments, the growth template layer (or the FCC structure layer, if present) overlies the second layer of magnetically soft material. The second layer of magnetically soft material may have the same composition as the first layer of magnetically soft material or may have a different composition. In some embodiments, the growth template layer comprises Ru of a thickness which results in antiferromagnetic coupling between the first layer of magnetically soft material and the second layer of magnetically soft material. Antiferromagnetic coupling of the first and second layers of magnetically soft material may reduce noise in the electronic signal produced in the read head when reading data from the magnetic storage media 18 compared to media 18 which do not include antiferromagnetic coupling in the soft underlayer.

The negative $K_u$ layer may resist flow of magnetic flux in a direction parallel to the axis along which the material exhibits negative $K_u$. When used in the composite soft underlayer, the negative $K_u$ layer thus may resist flow of magnetic flux from the composite soft underlayer, through the perpendicular magnetic recording layer, and to the return pole of the recording head. This may result in a lower magnetic flux concentration in the perpendicular magnetic recording layer as the magnetic field returns to the return pole. The lower magnetic flux concentration in the perpendicular magnetic recording layer may result in fewer STE events.

Figure 2:
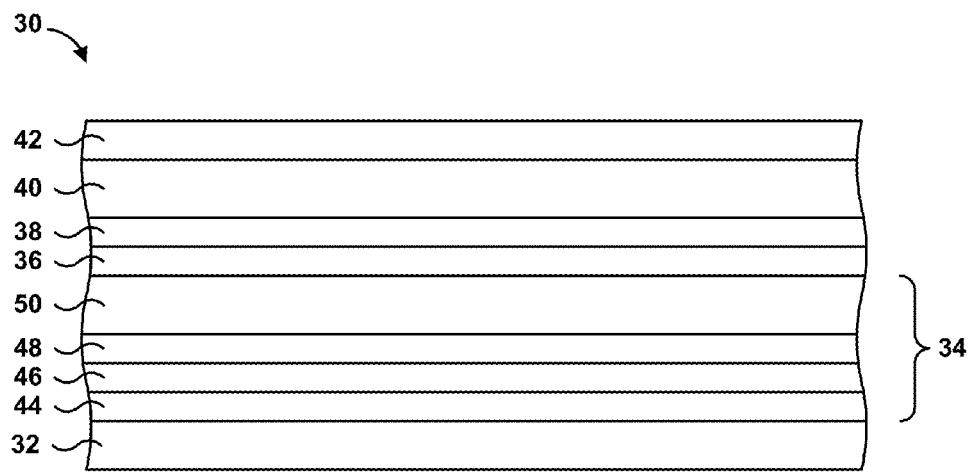
FIG. 2 is a schematic cross-sectional diagram illustrating an example of a magnetic recording medium including a composite soft underlayer according to an embodiment of the disclosure.

FIG. 2 is a cross-sectional diagram of an example of a magnetic recording medium 30 according to one embodiment of this disclosure. Magnetic recording medium 30 may include a substrate 32, a composite soft underlayer 34, a first interlayer 36, a second interlayer 38, a perpendicular recording layer 40, and a protective overcoat 42.

Substrate 32 may include any material that is suitable to be used in magnetic recording media, including, for example, Al, NiP plated Al, glass, ceramic glass, or the like. In some embodiments, substrate 32 may be a nonmagnetic material.

Although not shown in FIG. 2, in some embodiments, an additional underlayer may be present immediately on top of substrate 32. The additional underlayer may be amorphous and provides adhesion between the substrate and the first-deposited layer of composite soft underlayer 34. The additional underlayer also may provide low surface roughness.

Composite soft underlayer 34 includes a growth template layer 46, a negative $K_u$ layer 48, and a magnetically soft layer 50. Additionally, composite soft underlayer 34 may optionally include a face-centered cubic (FCC) structure layer 44 overlying substrate 32, as shown in FIG. 2.

In embodiments in which composite soft underlayer 34 includes FCC structure layer 44, FCC structure layer 44 may include a material which forms an FCC (111) growth orientation on an underlying amorphous layer. In this way, FCC structure layer 44 may generate a template for growth of overlying layers having an HCP crystal structure with a c-axis oriented substantially normal to the major plane of substrate 32. In some embodiments, FCC structure layer 44 includes Ni or a Ni-based alloy, such as NiFe, NiFeW, or the like.

Growth template layer 46 overlies FCC structure layer 44, and facilitates formation of a predetermined crystalline orientation of negative $K_u$ layer 48. In some embodiments, composite soft underlayer 34 may not include FCC structure layer 44, and growth template layer 46 may overly substrate 32 or the additional underlayer overlying substrate 32. Growth template layer 46 may include any material which facilitates formation of the preferred crystalline orientation of negative $K_u$ layer 48. For example, in some embodiments in which negative $K_u$ layer 48 comprises an HCP crystalline orientation, growth template layer 46 includes Ru, Ti, or a Ru-based alloy, such as RuTi, RuCr, or the like.

Growth template layer 46 may include a thickness sufficient to induce growth of the predetermined crystalline orientation of negative layer 48 when layer 48 is formed on growth template layer 46. In some embodiments, growth template layer 46 has a thickness of greater than about 0.4 nm. In other embodiments, growth template layer 46 has a thickness of greater than about 0.8 nm. In other embodiments, growth template layer 46 has a thickness between about 0.8 nm and about 2.0 nm. In some examples, growth template layer 46 has a thickness between about 1.3 nm and about 1.5 nm.

Negative $K_u$ layer 48 includes a material formed with a crystalline orientation which provides negative $K_u$ along an axis oriented substantially perpendicular to a major plane of composite soft underlayer 34. In many cases, negative $K_u$ layer 48 includes a granular material including a plurality of crystalline grains. Most or substantially all the grains have magnetic anisotropy and a magnetic easy plane (plane in which magnetic orientation is energetically favorable). In some embodiments, most or substantially all the grains have negative $K_u$ perpendicular to the easy plane of the grains. In some examples, most or substantially all the grains in negative $K_u$ layer 48 have a magnetic easy plane oriented substantially parallel to a major plane of negative $K_u$ layer 48.

Negative $K_u$ layer 48 may include any material capable of forming a crystalline structure which provides negative $K_u$ along an axis substantially perpendicular to a major plane of negative $K_u$ layer 48. In some embodiments, negative $K_u$ layer 48 includes CoX having a HCP crystalline structure, where X is any one of the 5d transition elements, such as Ir, Re, W, or the like. In some embodiments, negative $K_u$ layer 48 includes greater than about 5 atomic percent (at. %) of the 5d transition element. In some embodiments, negative layer 46 includes between about 5 at. % and about 25 at. % of the 5d transition element. In one example, negative $K_u$ layer 48 includes CoIr.

In some embodiments, negative $K_u$ layer 48 is sufficiently thin to reduce or substantially eliminate edge corrosion of layer 48. Edge corrosion may occur when a portion of a layer in magnetic recording medium 30 which is exposed along a perimeter of magnetic recording medium 30 is attacked by a corrosive species and corrodes. As shown below in FIG. 7, edge corrosion may lead to damage to magnetic recording medium 30, e.g., formation of bubbles of material along the perimeter of magnetic recording medium 30. It has been found that limiting a thickness of negative $K_u$ layer 48 may reduce or substantially eliminate edge corrosion of negative $K_u$ layer 48. For example, a negative layer 48 having a thickness of less than or equal to about 3 nm may reduce or substantially eliminate edge corrosion of negative $K_u$ layer 46. In some embodiments, a thickness of negative $K_u$ layer 48 may be about 2 nm.

Figure 4:
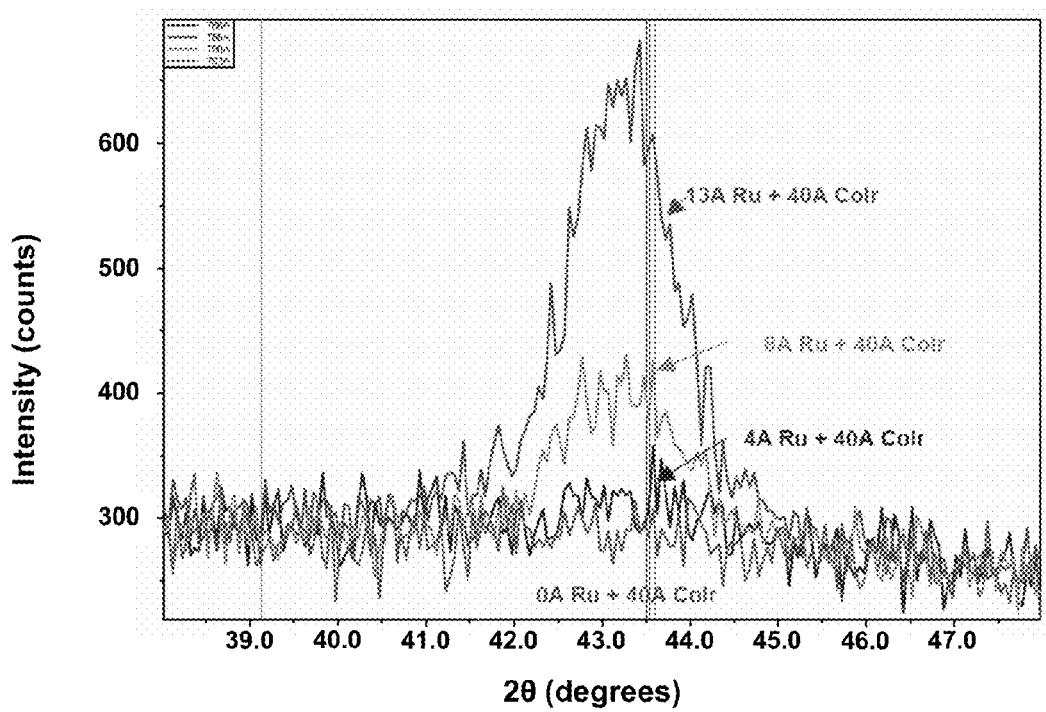
FIG. 4 is a diagram illustrating examples of x-ray diffraction scans collected for samples including a CoIr negative magnetic anisotropy and different thicknesses of a Ru growth template layer.

As described above, growth template layer 46 promotes crystal growth and crystal orientation within negative $K_u$ layer 48. This may be particularly beneficial when negative $K_u$ layer 48 is formed at relatively small thicknesses (e.g., less than about 3 nm), because the relatively small thickness of negative $K_u$ layer 48 does not allow sufficient thickness for the crystal structure of negative $K_u$ to transition from a type resulting from the structure of the underlying layer to the predetermined crystal structure. For example, as shown below in FIG. 4, a growth template layer 46 including Ru may improve HCP crystalline structure of a negative $K_u$ layer 48 including CoIr. Additionally, as shown in FIG. 4, a growth template layer 46 including a greater thickness of Ru may better facilitate growth of HCP crystalline structure of a negative $K_u$ layer 48 that includes CoIr than a growth template layer 46 that includes a lesser thickness of Ru. In some embodiments, instead including Ru, growth template layer 46 may include Ti, a Ru alloy, such as RuTi, RuCr, or another material that promotes HCP crystalline structure in negative $K_u$ layer 48.

Negative $K_u$ layer 48 may reduce STE events by reducing a magnetic flux concentration of the write field as the field propagates from composite soft underlayer 34, through the perpendicular magnetic recording layer 40, and to the return pole of the recording head. This may occur because negative $K_u$ layer 48 includes a material having grains with a magnetic easy plane substantially parallel to the major plane of composite soft underlayer 34 and negative $K_u$ along an axis substantially perpendicular to the major plane of composite soft underlayer 34. These magnetic properties serve to facilitate propagation of magnetic flux from the write field within composite soft underlayer 34 and resist propagation of magnetic flux from the write field in a direction perpendicular to the major plane of composite soft underlayer 34.

Composite soft underlayer 34 further includes a magnetically soft layer 50 overlying negative $K_u$ layer 48. Magnetically soft layer 50 may be an amorphous soft magnetic material. In some embodiments, magnetically soft layer 50 includes Ni, Co, Fe, or an alloy including at least one of Ni, Co, Fe. Some examples of materials which magnetically soft layer 50 may include are Ni, NiFe, Co, Fe, FeN, FeSiAl, FeSiAlN, CoZr, CoZrCr, CoZrNb, CoFeZrNb, CoFe, FeCoB, FeCoC, or FeCoZrTa.

First interlayer 36 and second interlayer 38 may be used to establish an HCP (hexagonal close packed) crystalline orientation that induces HCP (0002) growth of the perpendicular magnetic recording layer 40, with a magnetic easy axis substantially perpendicular to the major plane of recording layer 40.

Perpendicular magnetic recording layer 40 may include at least one magnetic layer having a magnetic easy axis substantially perpendicular to the major plane of recording layer 40. In some embodiments, perpendicular magnetic recording layer 40 may include multiple magnetic layers interspersed with non-magnetic spacing layers. The magnetic layers of perpendicular magnetic recording layer 40 may include, for example, a Co- or Fe-based alloy. In some examples, the Co- or Fe-based alloy may include at least one of Cr, Ni, Pt, Ta, B, Nb, O, Ti, Si, Mo, B, Cu, Ag, or Ge to affect the magnetic properties of the alloy. In some embodiments, the magnetic layers of perpendicular magnetic recording layer 40 may further include at least one non-magnetic oxide, which may segregate to grain boundaries of the magnetic material and reduce magnetic coupling between adjacent grains of magnetic material. The at least one non-magnetic oxide may include, for example, $SiO_2$, $TiO_2$, CoO, $Cr_2O_3$, or $Ta_2O_5$.

A protective overcoat 42, such as, for example, diamond like carbon, may overlie perpendicular magnetic recording layer 40. In other examples, protective overcoat 42 may include, for example, an amorphous carbon layer that further includes hydrogen or nitrogen.

Figure 3:
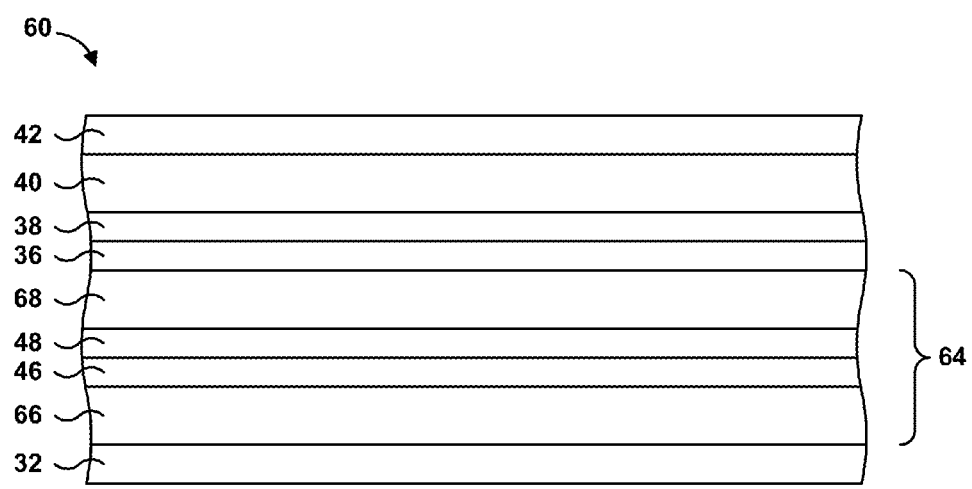
FIG. 3 is a schematic cross-sectional diagram illustrating another example of a magnetic recording medium including a composite soft underlayer according to an embodiment of the disclosure.

FIG. 3 illustrates another example of a magnetic recording medium 60 including a composite soft underlayer 64 according to one aspect of this disclosure. In the embodiment illustrated in FIG. 3, magnetic recording medium 60 includes a substrate 32, a composite soft underlayer 64, a first interlayer 36 and second interlayer 38, a perpendicular recording layer 40, and a protective overcoat 42.

As described above, substrate 32 may include any material that is suitable to be used in magnetic recording media, including, for example, Al, NiP plated Al, glass, ceramic glass, or the like.

Although not shown in FIG. 3, in some embodiments, an additional underlayer may be present immediately on top of substrate 32. The additional underlayer may be amorphous and provides adhesion between the substrate and the first-deposited layer of composite soft underlayer 34. The additional underlayer also may provide low surface roughness.

Composite soft underlayer 64 includes a first magnetically soft layer 66, a growth template layer 46, a negative $K_u$ layer 48, and a second magnetically soft layer 68. Although not illustrated in FIG. 3, in some embodiments, composite soft underlayer 64 may include a FCC structure layer 44 overlying first magnetically soft layer 66. In such embodiments, growth template layer 46 overlies FCC structure layer 44.

First magnetically soft layer 66 may be an amorphous soft magnetic material. In some embodiments, first magnetically soft layer 66 includes Ni, Co, Fe, or an alloy including at least one of Ni, Co, Fe. Some examples of materials which magnetically soft layer 50 may include are Ni, NiFe, Co, Fe, FeN, FeSiAl, FeSiAlN, CoZr, CoZrCr, CoZrNb, CoFeZrNb, CoFe, FeCoB, FeCoC, or FeCoZrTa.

As described above with respect to FIG. 2, growth template layer 46 facilitates formation of a predetermined crystalline orientation of negative $K_u$ layer 48. Growth template layer 46 may include any material which facilitates formation of the preferred crystalline orientation of negative $K_u$ layer 48. For example, in some embodiments in which negative $K_u$ layer 48 comprises an HCP crystalline orientation, growth template layer 46 includes Ru, Ti, or a Ru-based alloy, such as RuTi, RuCr, or the like.

Growth template layer 46 may include a thickness sufficient to induce growth of the predetermined crystalline orientation of negative $K_u$ layer 48 when layer 48 is formed on growth template layer 46. In some embodiments, growth template layer 46 has a thickness of greater than about 0.4 nm. In other embodiments, growth template layer 46 has a thickness of greater than about 0.8 nm. In another embodiment, growth template layer 46 has a thickness between about 0.8 nm and about 2.0 nm. In some examples, growth template layer 46 has a thickness between about 1.3 nm and about 1.5 nm.

Additionally, in some embodiments in which composite soft underlayer 64 includes first magnetically soft layer 66 and second magnetically soft layer 68, along with negative $K_u$ layer 48, growth template layer 46 may result in antiferromagnetic (AF) coupling between layers on either side of growth template layer 46. In some embodiments, AF coupling in composite soft underlayer 64 may reduce noise due to composite soft underlayer 64 in an electronic signal generated in a read head when reading data stored in perpendicular magnetic recording layer 40 compared to a magnetic recording medium which does not include an AF coupled soft underlayer 64.

In embodiments in which growth template layer 46 includes Ru, certain thicknesses of growth template layer 46 may result in AF coupling between layers on either side of growth template layer 46 (e.g., between first magnetically soft layer 66 and second magnetically soft layer 68). In some embodiments, AF coupling between first magnetically soft layer 66 and second magnetically soft layer 68 occurs when growth template layer 46 includes Ru and has a thickness between about 0.3 nm and about 0.6 nm or between about 1.4 nm and about 2.0 nm.

The thickness of growth template layer 46 may be selected based on considerations including, for example, the thickness of growth template layer 46 which induces the predetermined crystal orientation of negative $K_u$ layer 48 and the thickness of growth template layer 46 which provides or does not provide AF coupling between first magnetically soft layer 66 and second magnetically soft layer 68. In some examples, growth template layer 46 may have a thickness of about 1.4 nm.

As described above with respect to FIG. 2, negative $K_u$ layer 48 includes a material formed with a plurality of grains having a crystalline orientation which provides negative $K_u$ along an axis of the grain oriented substantially perpendicular to a major plane of composite soft underlayer 34. In some examples, most or substantially all the grains in negative $K_u$ layer 48 have a magnetic easy plane oriented substantially parallel to a major plane of negative $K_u$ layer 48 and negative $K_u$ along an axis oriented substantially perpendicular to the major plane of negative $K_u$ layer 48.

Negative $K_u$ layer 48 may include any material capable of forming a crystalline structure which provides negative $K_u$ along an axis substantially perpendicular to a major plane of negative $K_u$ layer 48. In some embodiments, negative $K_u$ layer 48 includes CoX having a HCP crystalline structure, where X is any one of the 5d transition elements, such as Ir, Re, W, or the like. In some embodiments, negative $K_u$ layer 48 includes greater than about 5 atomic percent (at. %) of the 5d transition element. In some embodiments, negative $K_u$ layer 46 includes between about 5 at. % and about 25 at. % of the 5d transition element. In one example, negative $K_u$ layer 48 includes CoIr.

In some embodiments, negative $K_u$ layer 48 is sufficiently thin to reduce or substantially eliminate edge corrosion of layer 48. For example, a negative $K_u$ layer 48 having a thickness of less than about 3 nm may reduce or substantially eliminate edge corrosion of negative $K_u$ layer 46. In some embodiments, a thickness of negative $K_u$ layer 48 may be about 2 nm.

As described above, growth template layer 46 promotes crystal growth and crystal orientation within negative $K_u$ layer 48. This may be particularly beneficial when negative $K_u$ layer 48 is formed at relatively small thicknesses (e.g., less than about 3 nm), because the relatively small thickness of negative $K_u$ layer 48 does not allow sufficient thickness for the crystal structure of negative $K_u$ to transition from a type resulting from the structure of the underlying layer to the predetermined crystal structure.

Negative $K_u$ layer 48 may reduce STE events by reducing a magnetic flux concentration of the write field as the field propagates from composite soft underlayer 34, through the perpendicular magnetic recording layer 40, and to the return pole of the recording head. This may occur because negative $K_u$ layer 48 includes a material having grains with a magnetic easy axis substantially parallel to the major plane of composite soft underlayer 34 and negative $K_u$ along an axis substantially perpendicular to the major plane of composite soft underlayer 34. These magnetic properties serve to facilitate propagation of magnetic flux from the write field within composite soft underlayer 34 and resist propagation of magnetic flux from the write field in a direction perpendicular to the major plane of composite soft underlayer 34.

Composite soft underlayer 34 further includes a second magnetically soft layer 68 overlying negative $K_u$ layer 48. Second magnetically soft layer 68 may be an amorphous soft magnetic material, and may have the same composition as first magnetically soft layer 66 or a different composition than first magnetically soft layer 66. In some embodiments, second magnetically soft layer 68 includes Ni, Co, Fe, or an alloy including at least one of Ni, Co, Fe. Some examples of materials which magnetically soft layer 50 may include are Ni, NiFe, Co, Fe, FeN, FeSiAl, FeSiAlN, CoZr, CoZrCr, CoZrNb, CoFeZrNb, CoFe, FeCoB, FeCoC, or FeCoZrTa.

First interlayer 36 and second interlayer 38 may be used to establish an HCP (hexagonal close packed) crystalline orientation that induces HCP (0002) growth of the perpendicular magnetic recording layer 40, with a magnetic easy axis substantially perpendicular to the major plane of recording layer 40.

Perpendicular magnetic recording layer 40 may include at least one magnetic layer having a magnetic easy axis substantially perpendicular to the major plane of recording layer 40. In some embodiments, perpendicular magnetic recording layer 40 may include multiple magnetic layers interspersed with non-magnetic spacing layers. The magnetic layers of perpendicular magnetic recording layer 40 may include, for example, a Co- or Fe-based alloy. In some examples, the Co- or Fe-based alloy may include at least one of Cr, Ni, Pt, Ta, B, Nb, O, Ti, Si, Mo, B, Cu, Ag, or Ge to affect the magnetic properties of the alloy. In some embodiments, the magnetic layers of perpendicular magnetic recording layer 40 may further include at least one non-magnetic oxide, which may segregate to grain boundaries of the magnetic material and reduce magnetic coupling between adjacent grains of magnetic material. The at least one non-magnetic oxide may include, for example, $SiO_2$, $TiO_2$, CoO, $Cr_2O_3$, or $Ta_2O_5$.

A protective overcoat 42, such as, for example, diamond like carbon, may overlie perpendicular magnetic recording layer 40. In other examples, protective overcoat 42 may include, for example, an amorphous carbon layer that further includes hydrogen or nitrogen.

EXAMPLES

Comparative Example 1 and Examples 1-3

FIG. 4 is a diagram illustrating X-ray diffraction (XRD) scans of samples including different growth template layer thicknesses. The growth template layers each included Ru. Each of the samples shown in FIG. 4 included a negative $K_u$ layer of about 4.0 nm of CoIr. As FIG. 4 shows, an increasing thickness of the Ru growth template layer generally increased the XRD peak corresponding to HCP CoIr at about 43.5°. Specifically, a Ru growth template layer with a thickness of about 0.4 nm showed relatively little change in CoIr structure compared to the sample including no Ru growth template layer, while the Ru growth template layer with a thickness of about 1.3 nm showed the greatest peak corresponding to HCP CoIr of the tested samples.

Examples 4-6

Figure 5:
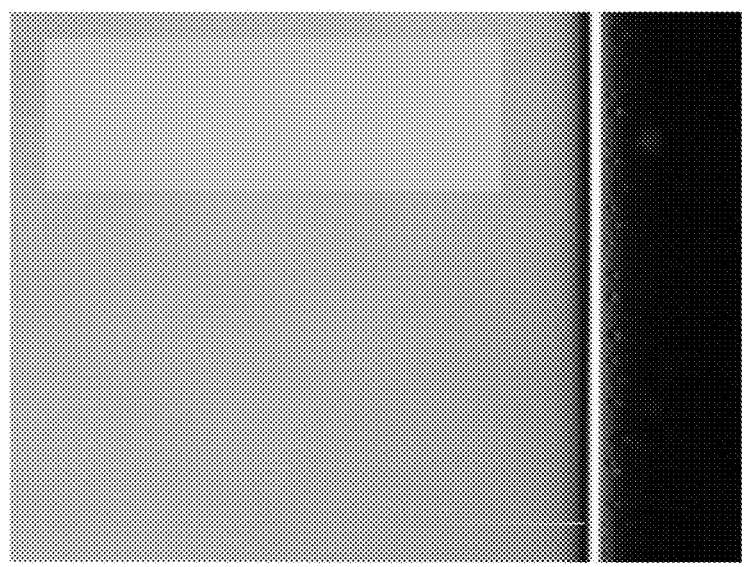
FIG. 5 is an optical microscopy image illustrating an example of a magnetic recording medium including a composite underlayer according to an aspect of this disclosure after exposure to a corrosive atmosphere.
Figure 6:
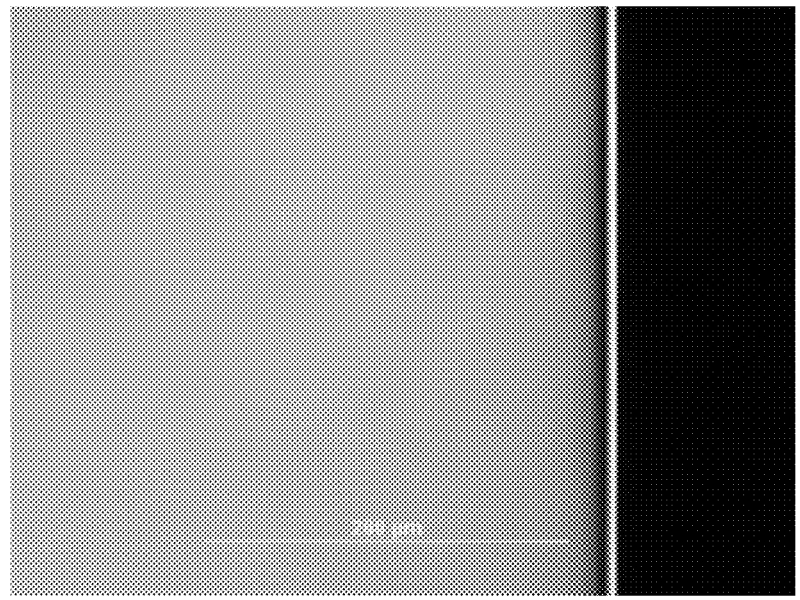
FIG. 6 is an optical microscopy image illustrating another example of a magnetic recording medium including a composite underlayer according to an aspect of this disclosure after exposure to a corrosive atmosphere.
Figure 7:
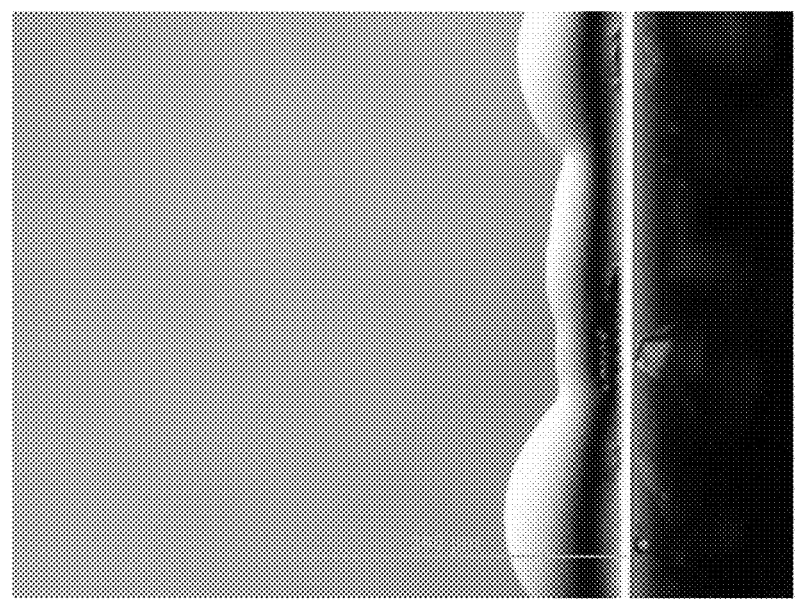
FIG. 7 is an optical microscopy image illustrating another example of a magnetic recording medium including a composite underlayer according to an aspect of this disclosure after exposure to a corrosive atmosphere.

FIGS. 5-7 show optical micrographs of magnetic recording media after being exposed to corrosive atmospheres. In particular, each of the sample illustrated in FIGS. 5-7 were placed in a chamber for 24 hours with a 0.5 N HCl solution. The media were exposed to HCl vapors throughout the 24 hours. After the 24 hour exposure, the edges of the media were examined by optical microscopy and the images shown in FIGS. 5-7 were collected.

FIG. 5 shows edge corrosion results for a magnetic recording media containing a composite soft underlayer including a first magnetically soft layer with a thickness of about 9.5 nm, a Ru growth template layer with a thickness of about 3.0 nm, a CoIr negative $K_u$ layer with a thickness of about 2.0 nm, and a second magnetically soft layer with a thickness of about 7.5 nm. The sample in FIG. 5 shows substantially no edge corrosion.

FIG. 6 shows edge corrosion results for a magnetic recording media containing a composite soft underlayer including a first magnetically soft layer with a thickness of about 9.5 nm, a Ru growth template layer with a thickness of about 3.0 nm, a CoIr negative $K_u$ layer with a thickness of about 3.0 nm, and a second magnetically soft layer with a thickness of about 9.5 nm. The sample in FIG. 6 also shows substantially no edge corrosion.

FIG. 7 shows edge corrosion results for a magnetic recording media containing a composite soft underlayer including a first magnetically soft layer with a thickness of about 9.5 nm, a Ru growth template layer with a thickness of about 3.0 nm, a CoIr negative $K_u$ layer with a thickness of about 4.0 nm, and a second magnetically soft layer with a thickness of about 7.0 nm. The sample in FIG. 7 shows bubbles forming along the edge of the magnetic recording medium due to edge corrosion.

Comparative Example 2 and Example 7

Figure 8:
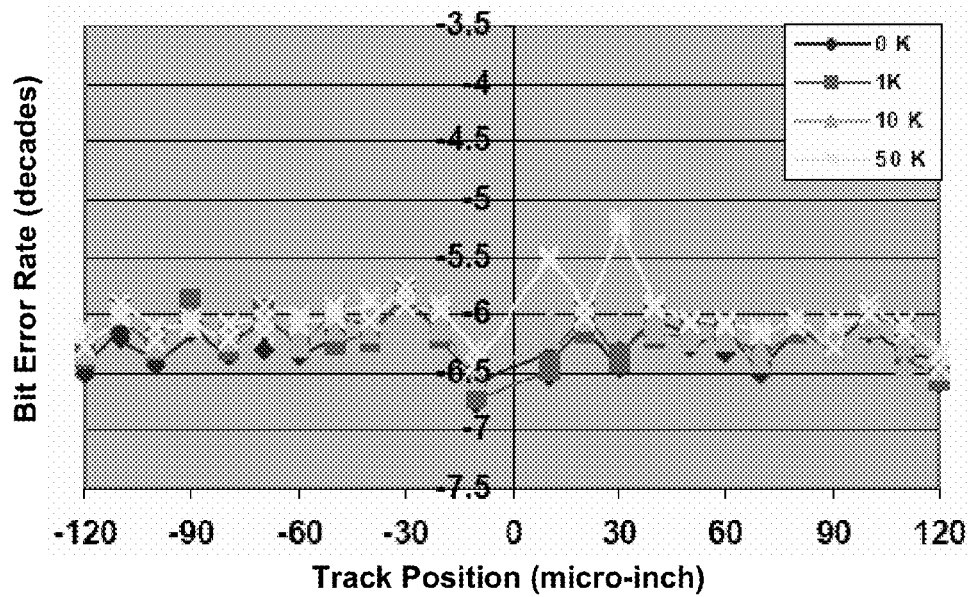
FIG. 8 is a line diagram of bit error rate versus track position for an example of a magnetic recording media that did not include a composite soft underlayer.
Figure 9:
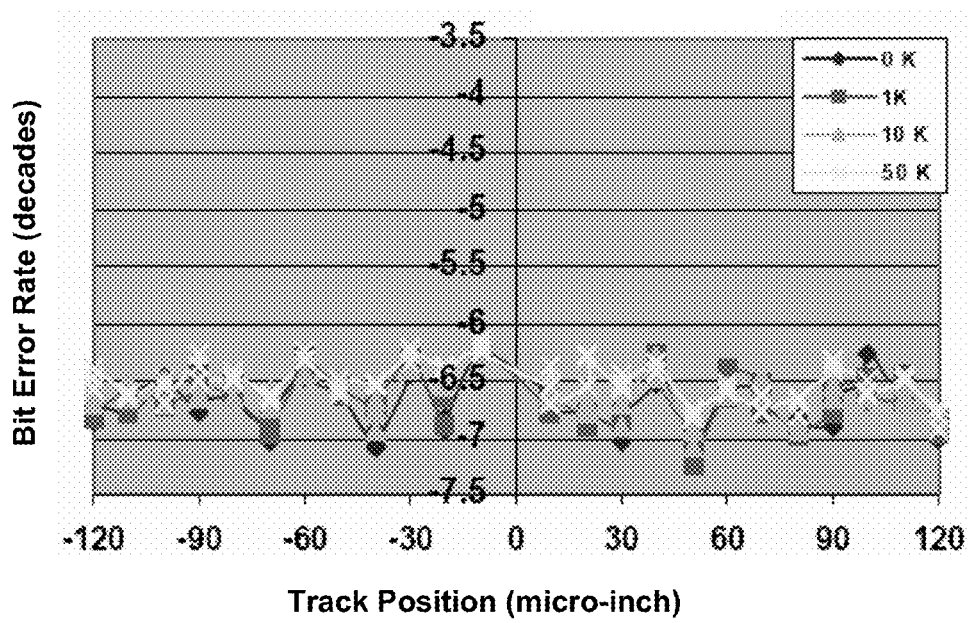
FIG. 9 is a line diagram of bit error rate versus track position for an example of a magnetic recording media that included a composite soft underlayer according to an aspect of this disclosure.

FIGS. 8 and 9 show examples of STE measurements performed on a magnetic recording medium which did not include a composite soft underlayer (Comparative Example 2; FIG. 8) and a magnetic recording medium which included a composite soft underlayer according to one aspect of this disclosure (Example 7; FIG. 9). FIGS. 8 and 9 show bit error rates (BER) as a function of track position, measured in micro-inches. The BER is shown in decades, i.e., a value of −6.5 represents one error per $10^{6.5}$ bits (about ⅓, 162,278). Accordingly, a lower BER represents fewer errors, and a smaller increase in BER after recording cycles indicates fewer STE events.

FIG. 8 illustrates that after 50,000 recording cycles, STE events have increased at track positions of about positive +10 micro-inches and about +30 micro-inches. In contrast, FIG. 9 illustrates that the BER is substantially similar after 50,000 recording cycles as after the first recording cycle. In other words, FIG. 9 shows that a composite soft underlayer according to one aspect of this disclosure may reduce frequency of STE events and reduce BER compare to a magnetic recording medium which does not include a composite soft underlayer.

Examples 8-11 and Comparative Examples 3 and 4

Table 1 shows the layer construction of Examples 8-11 and Comparative Examples 3 and 4. Each of Examples 8-11 included a composite soft underlayer in accordance with one aspect of the disclosure. Note that the CoIr layer for Examples 8-11 included only CoIr, while the CoIr layer for Example 11 included CoIr and an oxide. Comparative Examples 3 and 4 included a soft underlayer which did not contain a negative $K_u$ layer. Table 1 also lists magnetic properties of the recording layer for each of Examples 8-11 and Comparative Examples 3 and 4, and shows that the listed magnetic properties were substantially similar for each of the samples.

TABLE 1

| Sample | MSL 1 (nm) | Ru (nm) | CoIr (nm) | MSL 2 (nm) | $H_c$ (Oe) | $H_n$ (Oe) | $M_{rt}$ (memu/cm$^2$) | $H_c - H_n$ (Oe) |
|---|---|---|---|---|---|---|---|---|
| Example 8 | 9.5 | 3.0 | 2.0 | 9.5 | 4769 | 1813 | 0.864 | 2956 |
| Example 9 | 9.5 | 3.0 | 2.0 | 7.5 | 4642 | 1725 | 0.844 | 2917 |
| Example 10 | 9.5 | 3.0 | 4.0 | 7.0 | 4726 | 1772 | 0.867 | 2954 |
| Example 11 | 9.5 | 0.8 | 3.5 | 9.5 | 4628 | 1727 | 0.806 | 2901 |
| Comparative Example 3 | 9.5 | 0.4 | 0 | 9.5 | 4650 | 1716 | 0.846 | 2934 |
| Comparative Example 4 | 9.5 | 0.4 | 0 | 9.5 | 4647 | 1736 | 0.799 | 2911 |

Table 2 shows BER data collected for various combinations of recording heads and magnetic recording media samples. Each of Recording Heads 1, 2, and 3 were front shield heads, although particulars of the Recording Heads differed. Table 2 shows the initial BER measured after the first recording cycle and the final BER measured after 50,000 recording cycles. Table 2 also shows an STE Margin for each sample. A lower STE Margin means the sample had a lower incidence of STE events. The STE Margin is calculated by the following equation:

$$STE\ \text{Margin} = \frac{BER_{initial} - BER_{final}}{BER_{initial} + 4}$$

TABLE 2

| Recording Head | Sample | Initial BER (decade) | Final BER (decade) | STE Margin (%) |
|---|---|---|---|---|
| 1 | Example 8 | −6.94 | −3.2 | 127 |
| 1 | Comparative Example 3 | −5.02 | −2.54 | 243 |
| 2 | Example 8 | −6.93 | −6.51 | 14 |
| 2 | Example 9 | −6.7 | −5.54 | 43 |
| 2 | Example 10 | −6.24 | −5.89 | 16 |
| 2 | Example 11 | −6.6 | −5.75 | 33 |
| 2 | Comparative Example 3 | −6.4 | −5.2 | 50 |
| 2 | Comparative Example 4 | −5.77 | −4.83 | 53 |
| 3 | Example 8 | −6.95 | −5.16 | 61 |
| 3 | Example 9 | −6.7 | −5.47 | 46 |
| 3 | Example 10 | −6.48 | −5.21 | 51 |
| 3 | Example 11 | −7.23 | −5.27 | 61 |
| 3 | Comparative Example 3 | −6.19 | −4.25 | 89 |
| 3 | Comparative Example 4 | −6.54 | −5.02 | 60 |

Figure 10:
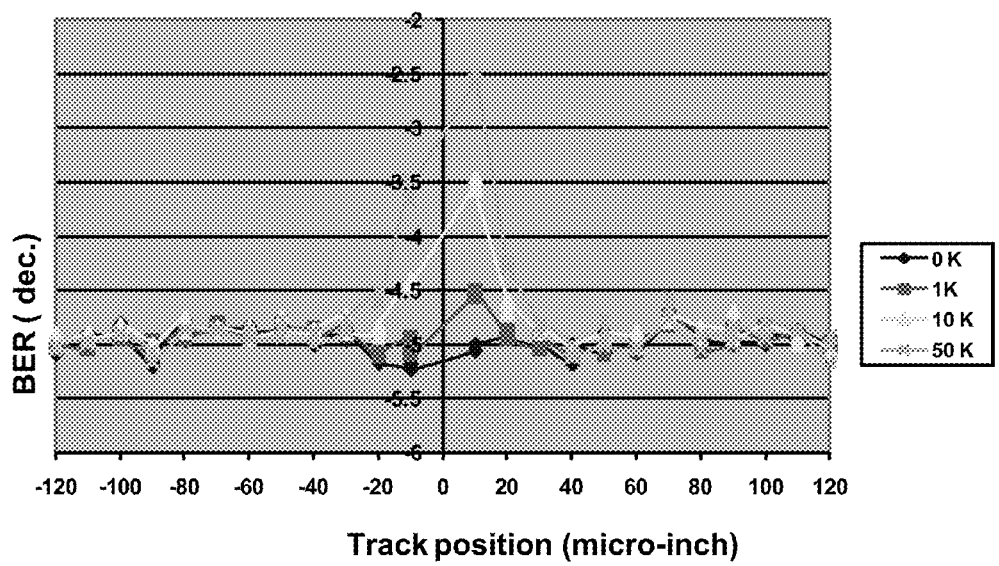
FIG. 10 is a line diagram of bit error rate versus track position for an example of a magnetic recording media that did not include a composite soft underlayer.

FIG. 10 illustrates the BER data collected for the combination of Recording Head 1 and Comparative Example 3. BER data was measured after 0 recording cycles, 1,000 recording cycles, 10,000 recording cycles, and 50,000 recording cycles at multiple positions on either side of the data track to which data was written. FIG. 10 shows that the initial BER was about −5.0 decades at all positions. FIG. 10 shows a peak at about positive 10 micro-inches, and the peak has a BER value of −2.5 decades after 50,000 recording cycles. This led to calculation of an STE Margin of 243 for the combination of Recording Head 1 and Comparative Example 3.

Figure 11:
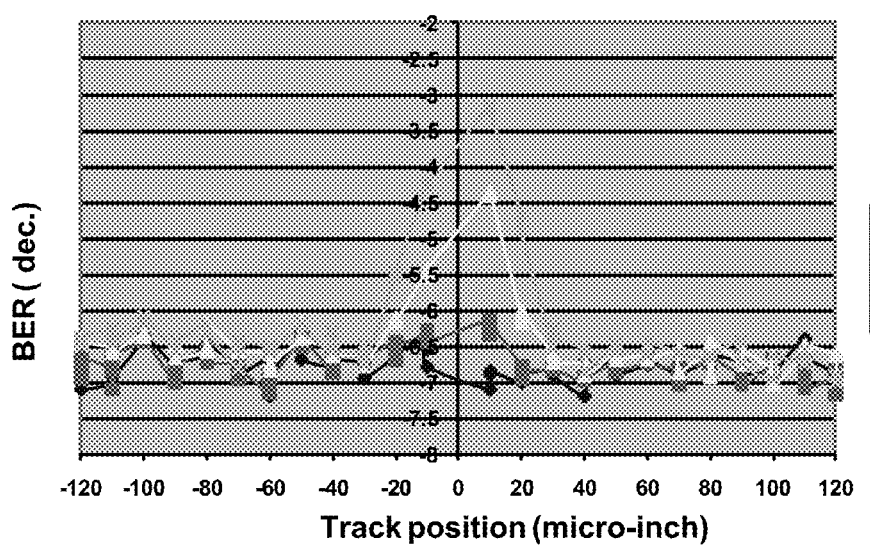
FIG. 11 is a line diagram of bit error rate versus track position for an example of a magnetic recording media that included a composite soft underlayer according to an aspect of this disclosure.

FIG. 11 illustrates the BER data collected for the combination of Recording Head 1 and Example 8. FIG. 11 illustrates that the initial BER of Example 8 and Recording Head 1 was about −6.75 decades at all positions. FIG. 11 also shows that the peak BER value for the combination of Recording Head 1 and Example 8 after 50,000 recording cycles was about −3.2 decades. This led to a calculated STE Margin of 127, as shown in Table 2, which is lower than the STE Margin of Comparative Example 3.

Figure 12:
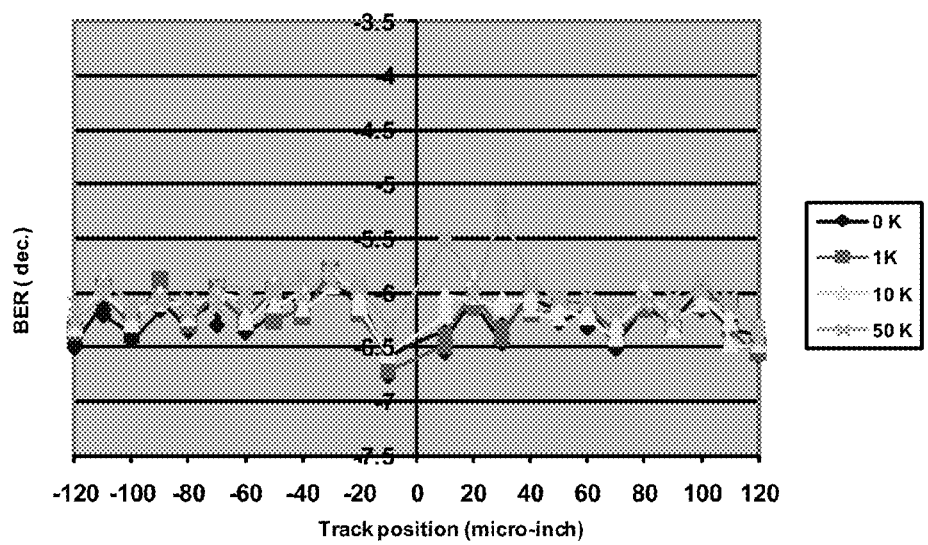
FIG. 12 is a line diagram of bit error rate versus track position for an example of a magnetic recording media that did not include a composite soft underlayer.

FIG. 12 illustrates BER data collected for a combination of Recording Head 2 and Comparative Example 3. FIG. 12 shows an initial BER of about −6.4 decades at about +30 micro-inches. FIG. 12 also shows two peaks where the BER increased significantly, at about +10 micro-inches and about +30 micro-inches. The final BER at +30 micro-inches after 50,000 recording cycles was about −5.2 decades. This led to a calculated STE Margin of 50 for the combination of Recording Head 2 and Comparative Example 3.

Figure 13:
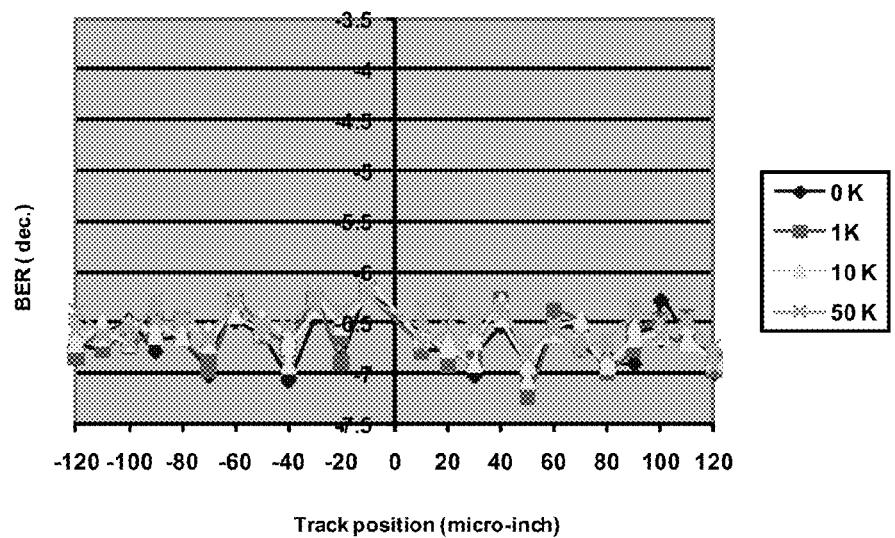
FIG. 13 is a line diagram of bit error rate versus track position for an example of a magnetic recording media that included a composite soft underlayer according to an aspect of this disclosure.

FIG. 13 illustrates BER data collected for a combination of Recording Head 2 and Example 8. Compared to the BER data shown in FIG. 12, FIG. 13 shows that the peaks in final BER at about +10 micro-inches and about +30 micro-inches were substantially suppressed. The initial BER at about +30 micro-inches for the combination of Recording Head 2 and Example 8 was about −6.93 decades. The final BER at +30 micro-inches after 50,000 recording cycles was about −6.51 decades. This led to a calculated STE Margin of 14 for the combination of Recording Head 2 and Example 8, which is lower than the STE Margin for the combination of Recording Head 2 and Comparative Example 3.

Figure 14:
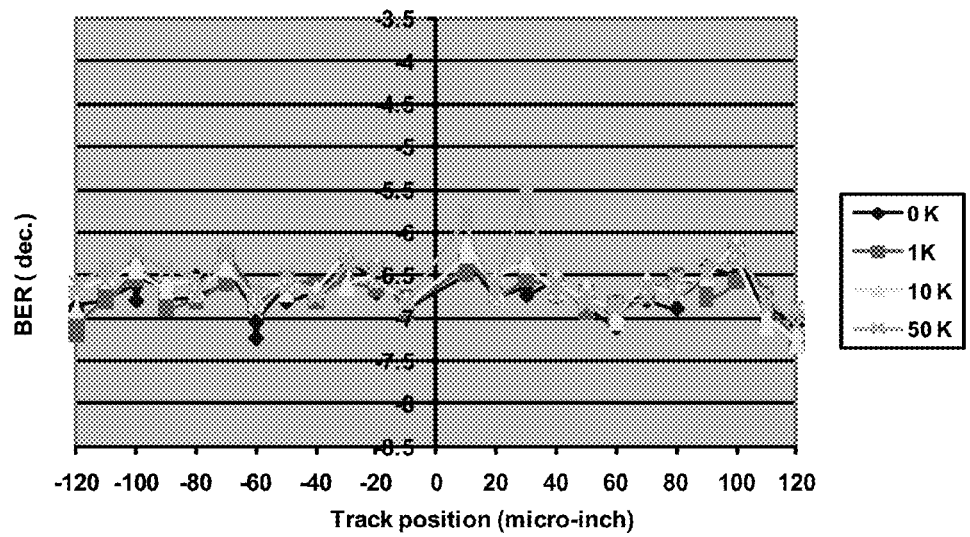
FIG. 14 is a line diagram of bit error rate versus track position for an example of a magnetic recording media that included a composite soft underlayer according to an aspect of this disclosure.

FIG. 14 illustrates BER data collected for a combination of Recording Head 2 and Example 9. FIG. 14 shows two peaks in final BER, at about +10 micro-inches and about +30 micro-inches. The initial BER at about +30 micro-inches for the combination of Recording Head 2 and Example 9 was about −6.7 decades. The final BER at +30 micro-inches after 50,000 recording cycles was about −5.54 decades. This led to a calculated STE Margin of 43 for the combination of Recording Head 2 and Example 9, which is lower than the STE Margin for the combination of Recording Head 2 and Comparative Example 3.

Figure 15:
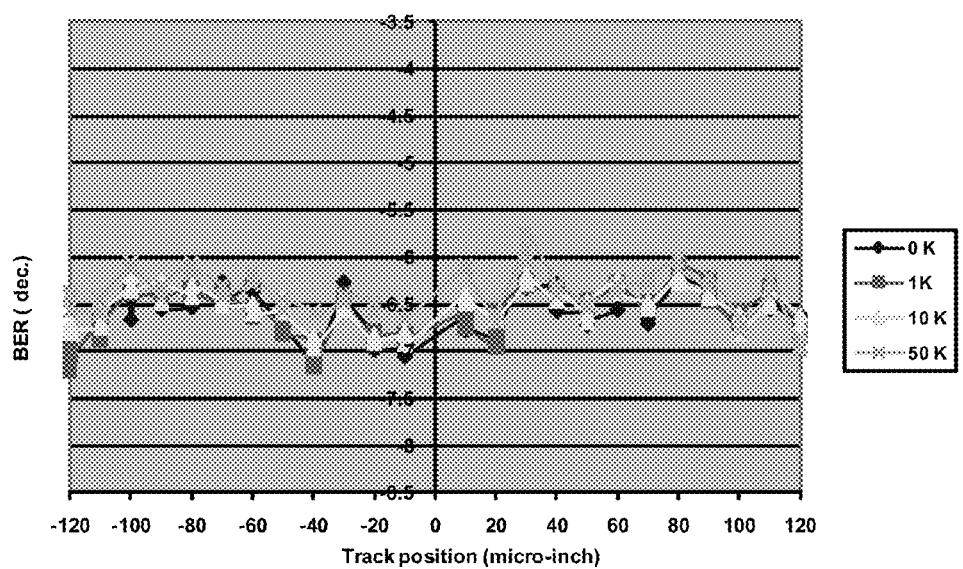
FIG. 15 is a line diagram of bit error rate versus track position for an example of a magnetic recording media that included a composite soft underlayer according to an aspect of this disclosure.

FIG. 15 illustrates BER data collected for a combination of Recording Head 2 and Example 10. FIG. 15 shows two peaks in final BER, at about +10 micro-inches and about +30 micro-inches. The initial BER at about +30 micro-inches for the combination of Recording Head 2 and Example 10 was about −6.24 decades. The final BER at +30 micro-inches after 50,000 recording cycles was about −5.89 decades. This led to a calculated STE Margin of 16 for the combination of Recording Head 2 and Example 10, which is lower than the STE Margin for the combination of Recording Head 2 and Comparative Example 3.

Figure 16:
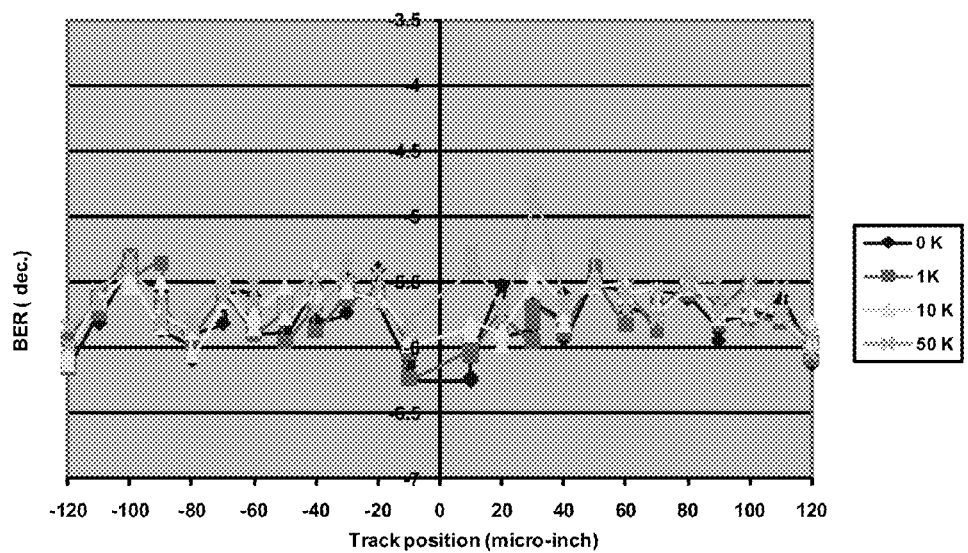
FIG. 16 is a line diagram of bit error rate versus track position for an example of a magnetic recording media that did not include a composite soft underlayer.

FIG. 16 illustrates BER data collected for a combination of Recording Head 2 and Comparative Example 4. FIG. 16 shows an initial BER of about −5.77 decades at about +30 micro-inches. FIG. 16 also shows two peaks where the BER increased significantly, at about +10 micro-inches and about +30 micro-inches. The final BER at +30 micro-inches after 50,000 recording cycles was about −4.83 decades. This led to a calculated STE Margin of 53 for the combination of Recording Head 2 and Comparative Example 4.

Figure 17:
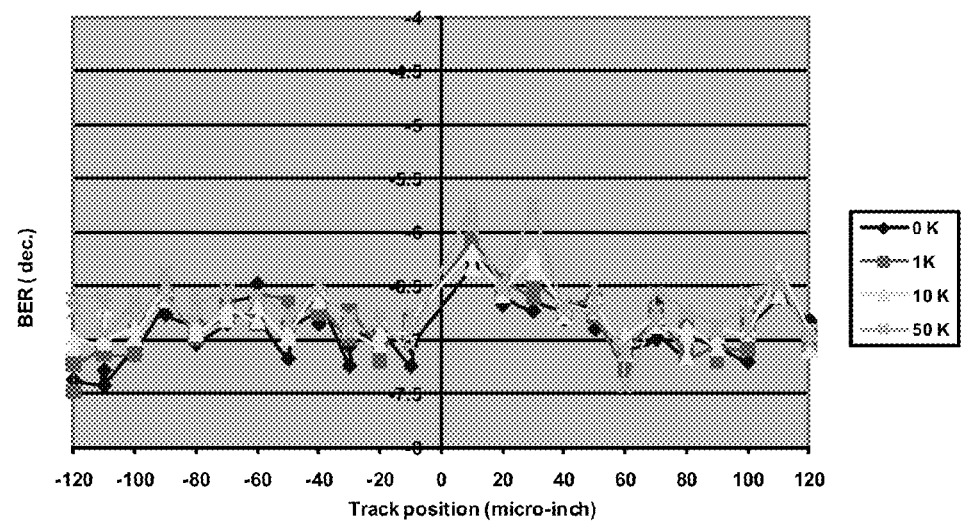
FIG. 17 is a line diagram of bit error rate versus track position for an example of a magnetic recording media that included a composite soft underlayer according to an aspect of this disclosure.

FIG. 17 illustrates BER data collected for a combination of Recording Head 2 and Example 11. FIG. 17 shows two peaks in final BER, at about +10 micro-inches and about +30 micro-inches. The initial BER at about +30 micro-inches for the combination of Recording Head 2 and Example 11 was about −6.6 decades. The final BER at +30 micro-inches after 50,000 recording cycles was about −5.75 decades. This led to a calculated STE Margin of 33 for the combination of Recording Head 2 and Example 11, which is lower than the STE Margin for the combination of Recording Head 2 and Comparative Example 4.

Figure 18:
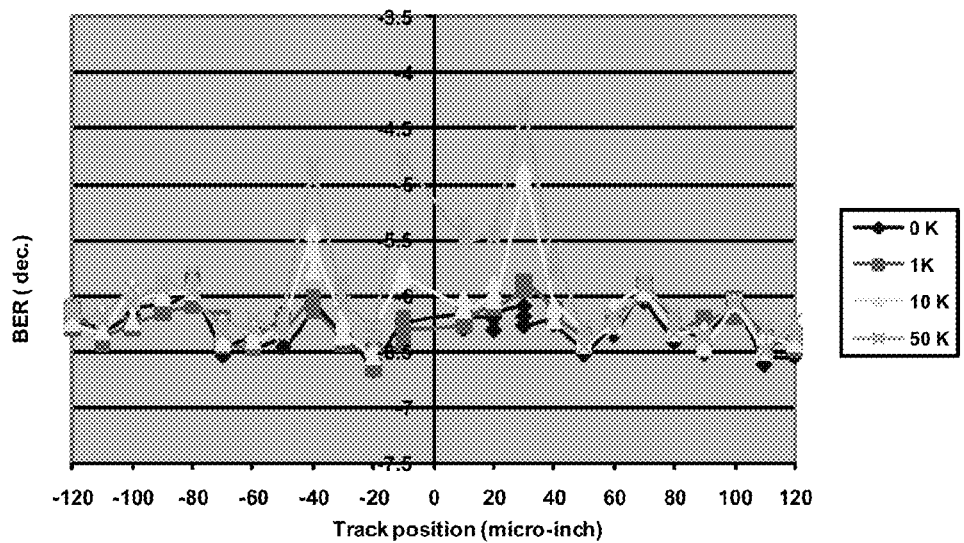
FIG. 18 is a line diagram of bit error rate versus track position for an example of a magnetic recording media that did not include a composite soft underlayer.

FIG. 18 illustrates BER data collected for a combination of Recording Head 3 and Comparative Example 3. FIG. 18 shows three peaks where the BER increased significantly, at about −40 micro-inches, about −10 micro-inches and about +30 micro-inches. FIG. 16 shows an initial BER of about −6.19 decades at about +30 micro-inches. The final BER at +30 micro-inches after 50,000 recording cycles was about −4.25 decades. This led to a calculated STE Margin of 89 for the combination of Recording Head 3 and Comparative Example 3.

Figure 19:
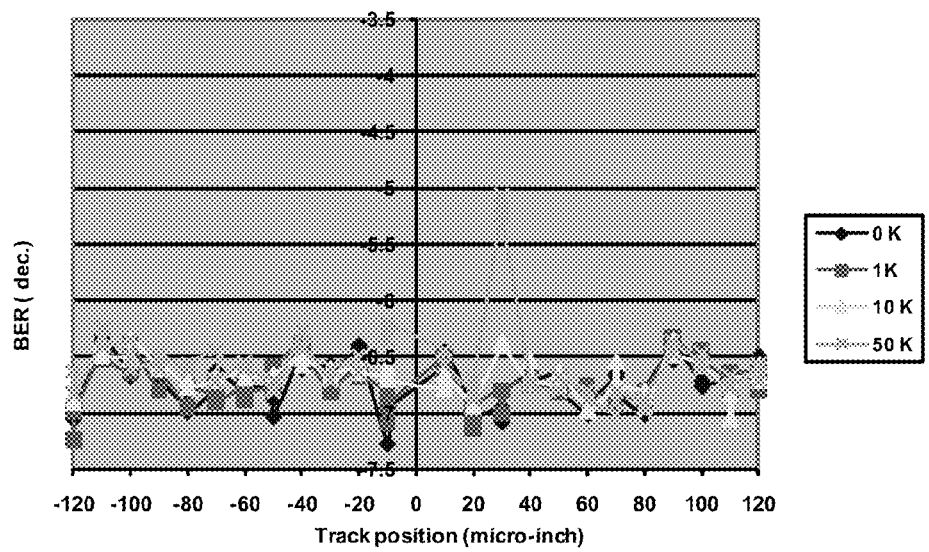
FIG. 19 is a line diagram of bit error rate versus track position for an example of a magnetic recording media that included a composite soft underlayer according to an aspect of this disclosure.

FIG. 19 illustrates BER data collected for a combination of Recording Head 3 and Example 8. FIG. 19 shows only one peak in final BER, at about +30 micro-inches. The combination of Recording Head 3 and Example 8 shows substantially no indication of BER peaks after 50,000 recording cycles at −40 micro-inches or at −10 micro-inches. The initial BER at about +30 micro-inches for the combination of Recording Head 3 and Example 8 was about −6.95 decades. The final BER at +30 micro-inches after 50,000 recording cycles was about −5.16 decades. This led to a calculated STE Margin of 61 for the combination of Recording Head 3 and Example 8.

Figure 20:
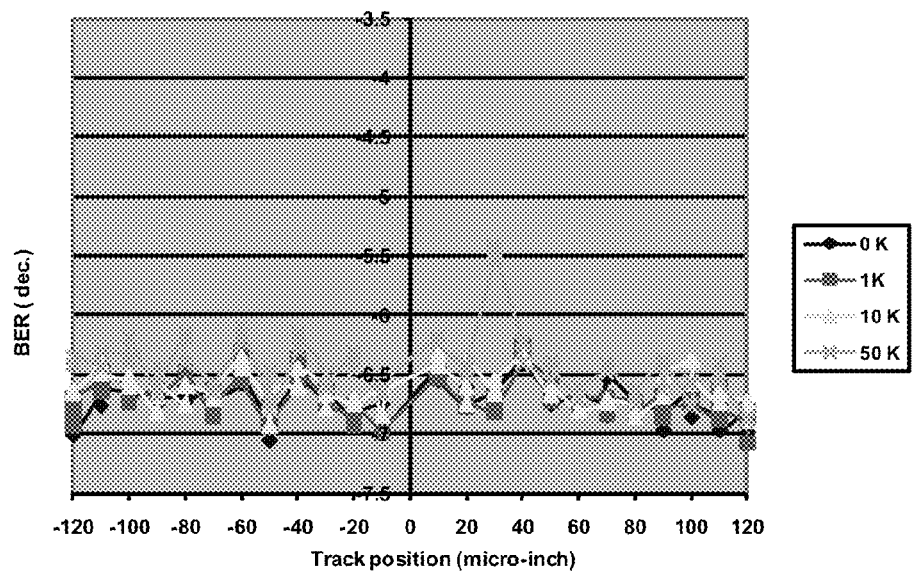
FIG. 20 is a line diagram of bit error rate versus track position for an example of a magnetic recording media that included a composite soft underlayer according to an aspect of this disclosure.

FIG. 20 illustrates BER data collected for a combination of Recording Head 3 and Example 9. FIG. 20 shows only one peak in final BER after 50,000 recording cycles, at about +30 micro-inches. The combination of Recording Head 3 and Example 9 shows substantially no indication of BER peaks after 50,000 recording cycles at −40 micro-inches or at −10 micro-inches. The initial BER at about +30 micro-inches for the combination of Recording Head 3 and Example 9 was about −6.7 decades. The final BER at +30 micro-inches after 50,000 recording cycles was about −5.47 decades. This led to a calculated STE Margin of 46 for the combination of Recording Head 3 and Example 9, which is lower than the calculated STE Margin for the combination of Recording Head 3 and Comparative Example 3.

Figure 21:
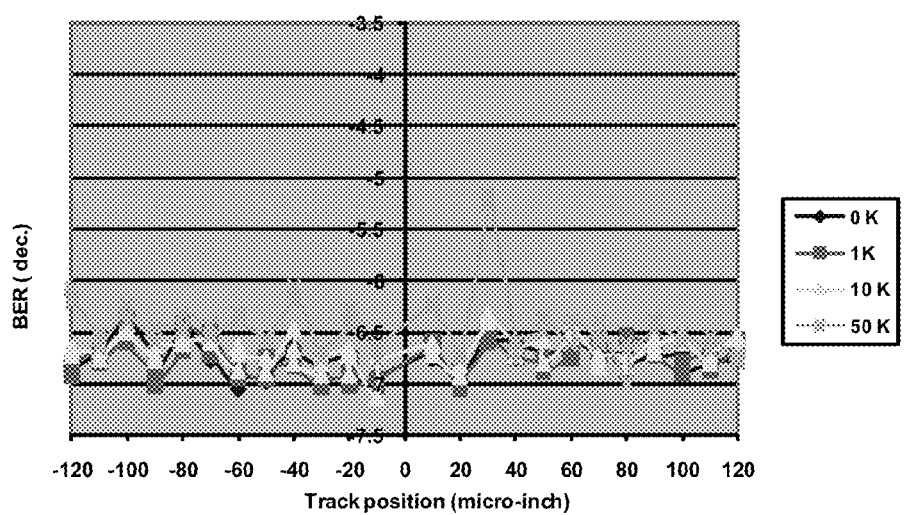
FIG. 21 is a line diagram of bit error rate versus track position for an example of a magnetic recording media that included a composite soft underlayer according to an aspect of this disclosure.

FIG. 21 illustrates BER data collected for a combination of Recording Head 3 and Example 10. FIG. 21 shows only one peak in final BER after 50,000 recording cycles, at about +30 micro-inches. The combination of Recording Head 3 and Example 10 shows substantially no indication of BER peaks after 50,000 recording cycles at −40 micro-inches or at −10 micro-inches. The initial BER at about +30 micro-inches for the combination of Recording Head 3 and Example 10 was about −6.48 decades. The final BER at +30 micro-inches after 50,000 recording cycles was about −5.21 decades. This led to a calculated STE Margin of 51 for the combination of Recording Head 3 and Example 10, which is lower than the calculated STE Margin for the combination of Recording Head 3 and Comparative Example 3

Figure 22:
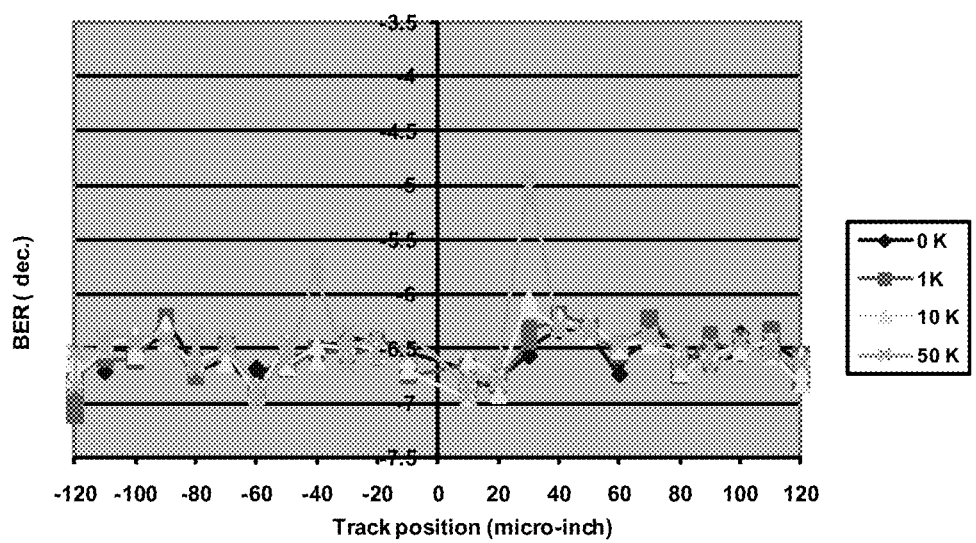
FIG. 22 is a line diagram of bit error rate versus track position for an example of a magnetic recording media that did not include a composite soft underlayer.

FIG. 22 illustrates BER data collected for a combination of Recording Head 3 and Comparative Example 4. FIG. 18 shows two peaks where the BER increased significantly after 50,000 recording cycles, at about −40 micro-inches and about +30 micro-inches. FIG. 22 shows an initial BER of about −6.54 decades at about +30 micro-inches. The final BER at +30 micro-inches after 50,000 recording cycles was about −5.02 decades. This led to a calculated STE Margin of 60 for the combination of Recording Head 3 and Comparative Example 4.

Figure 23:
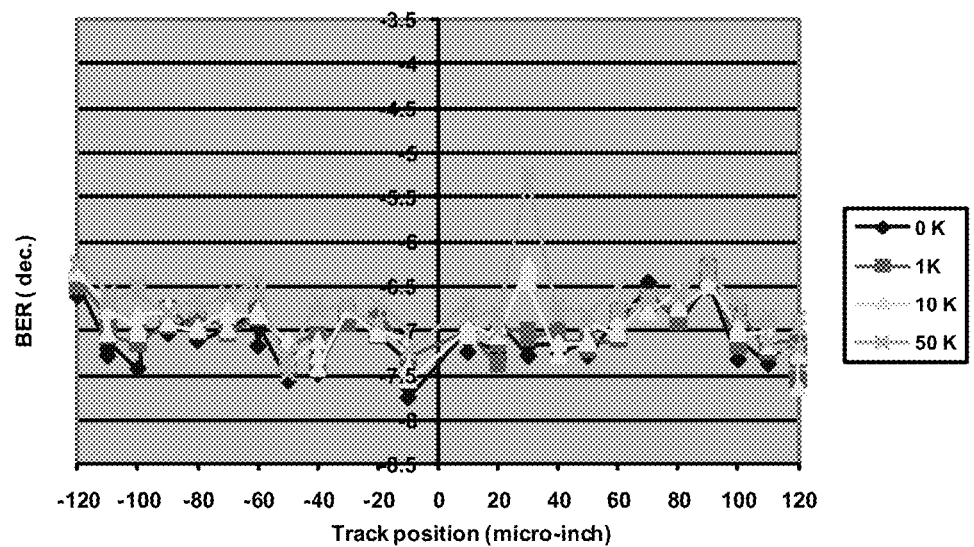
FIG. 23 is a line diagram of bit error rate versus track position for an example of a magnetic recording media that included a composite soft underlayer according to an aspect of this disclosure.

FIG. 23 illustrates BER data collected for a combination of Recording Head 3 and Example 11. FIG. 23 shows only one peak in final BER after 50,000 recording cycles, at about +30 micro-inches. The combination of Recording Head 3 and Example 11 shows substantially no indication of BER peaks after 50,000 recording cycles at −40 micro-inches. The initial BER at about +30 micro-inches for the combination of Recording Head 3 and Example 11 was about −7.23 decades. The final BER at +30 micro-inches after 50,000 recording cycles was about −5.27 decades. This led to a calculated STE Margin of 61 for the combination of Recording Head 3 and Example 11.

Various embodiments have been described. These and other embodiments are within the scope of the following claims.

The invention claimed is:

1. An apparatus comprising:
   a composite soft underlayer, wherein the composite soft underlayer comprises:
      a growth template layer,
      a negative magnetic anisotropy layer overlying the growth template layer, wherein the negative magnetic anisotropy layer comprises a plurality of grains, wherein substantially all the grains have negative magnetic anisotropy along an axis substantially perpendicular to a major plane of the composite soft underlayer, and wherein the negative magnetic anisotropy layer comprises a thickness of less than or equal to about 3 nm, and
      a magnetically soft layer overlying the negative magnetic anisotropy layer, the magnetically soft layer comprising a non-negative magnetic anisotropy layer; and
   a perpendicular magnetic recording layer overlying the composite soft underlayer.

2. The apparatus of claim 1, wherein the negative magnetic anisotropy layer comprises CoX, and wherein X comprises at least one of Ir, Re, or W.

3. The apparatus of claim 1, wherein the growth template layer comprises at least one of Ru, Ti, RuCr, or RuTi.

4. The apparatus of claim 3, wherein the growth template layer comprises a thickness of greater than about 0.4 nm.

5. The apparatus of claim 3, wherein the growth template layer comprises a thickness of between about 1.4 nm and about 2.0 nm.

6. The apparatus of claim 1, wherein the composite soft underlayer further comprises a second magnetically soft layer, and wherein the growth template layer overlies the second magnetically soft layer and the magnetically soft layer overlying the negative magnetic anisotropy layer and the second magnetically soft layer are antiferromagnetically coupled.

7. The apparatus of claim 1, wherein the negative magnetic anisotropy layer comprises a thickness of about 2 nm.

8. The apparatus of claim 1, wherein the composite soft underlayer further comprises a face-centered cubic structure layer, and wherein the growth template layer overlies the face-centered cubic structure layer.

9. The apparatus of claim 8, wherein the face-centered cubic structure layer comprises at least one of Ni, NiFe, or NiFeW.

10. A magnetic recording medium comprising:
a substrate;
a composite soft underlayer overlying the substrate, wherein the composite soft underlayer comprises:
  a growth template layer,
  a negative magnetic anisotropy layer overlying the growth template layer, wherein the negative magnetic anisotropy layer comprises a plurality of grains, wherein substantially all the grains have negative magnetic anisotropy along an axis substantially perpendicular to a major plane of the composite soft underlayer, and wherein the negative magnetic anisotropy layer comprises a thickness of less than or equal to about 3 nm, and
  a magnetically soft layer overlying the negative magnetic anisotropy layer, the magnetically soft layer comprising one or more of Ni, NiFe, Fe, FeN, FeSiAl, FeSiAlN, CoZr, CoZrCr, CoZrNb, CoFeZrNb, CoFe, FeCoB, FeCoC, and FeCoZrTa; and
a perpendicular magnetic recording layer overlying the composite soft underlayer.

11. The magnetic recording medium of claim 10, wherein the negative magnetic anisotropy layer comprises CoX, and wherein X comprises at least one of Ir, Re, or W.

12. The magnetic recording medium of claim 10, wherein the growth template layer comprises at least one of Ru, Ti, RuCr, or RuTi.

13. The magnetic recording medium of claim 12, wherein the growth template layer comprises a thickness of greater than about 0.4 nm.

14. The magnetic recording medium of claim 12, wherein the growth template layer comprises a thickness of between about 1.4 nm and about 2.0 nm.

15. The magnetic recording medium of claim 10, wherein the magnetically soft layer comprises a first magnetically soft layer, wherein the composite soft underlayer further comprises a second magnetically soft layer, and wherein the growth template layer overlies the second magnetically soft layer.

16. The magnetic recording medium of claim 15, wherein the first magnetically soft layer and the second magnetically soft layer are antiferromagnetically coupled.

17. The magnetic recording medium of claim 10, wherein the negative magnetic anisotropy layer comprises a thickness of about 2 nm.

18. The magnetic recording medium of claim 10, wherein the composite soft underlayer further comprises a face-centered cubic structure layer, and wherein the growth template layer overlies the face-centered cubic structure layer.

19. The magnetic recording medium of claim 18, wherein the face-centered cubic structure layer comprises at least one of Ni, NiFe, or NiFeW.

20. An apparatus comprising:
a composite soft underlayer, wherein the composite soft underlayer comprises:
  a growth template layer,
  a negative magnetic anisotropy layer overlying the growth template layer, wherein the negative magnetic anisotropy layer comprises a plurality of grains, wherein substantially all the grains have negative magnetic anisotropy along an axis substantially perpendicular to a major plane of the composite soft underlayer, and wherein the negative magnetic anisotropy layer comprises a thickness of less than or equal to about 3 nm,
  a magnetically soft layer directly adjacent and overlying the negative magnetic anisotropy layer; and
a perpendicular magnetic recording layer overlying the composite soft underlayer,
wherein the magnetically soft layer comprises a first magnetically soft layer, wherein the composite soft underlayer further comprises a second magnetically soft layer, and wherein the growth template layer overlies the second magnetically soft layer.

* * * * *